`United States Patent Office`

2,743,269
Patented Apr. 24, 1956

2,743,269

HETEROCYCLIC NITROGEN COMPOUNDS

Frederick F. Blicke, Ann Arbor, Mich., assignor to The Regents of the University of Michigan, Ann Arbor, Mich., a corporation of Michigan No Drawing. Application May 26, 1954,
Serial No. 432,584

1 Claim. (Cl. 260—239)

My invention relates to novel chemical compounds having therapeutic value and to salts of the parent compounds. More particularly, my invention relates to novel N,N',N,N' - diethylene - and N,N' - ethylene - N,N' - trimethylene - dipolymethylenimine quaternary hydroxides, and to the salts of these bases.

The compounds of my invention consist of the novel cations of the formula:

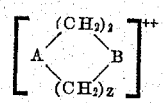

in which Z can be one of the integers 2 or 3, A can be N-pentamethyleniminium, N - hexamethyleniminium, N-(methyl-hexamethyleniminium), N - heptamethyleniminium, or N-octamethyleniminium and B can be N-hexamethylenimium, N-(methylhexamethyleniminium, or N-heptamethyleniminium and in which A and B are different and the total number of carbon atoms in the cation is at least 17, associated with an anionic residue to satisfy the valence requirements. The parent compounds, or quaternary hydroxides, of my invention consist of the above divalent cations associated with two hydroxyl ions. The salts of my invention consist of the above divalent cations associated with two monovalent anions such as chloride, bromide, benzoate, or picrate ions or the like or, alternatively, the divalent cations can be associated with a single divalent anion such as sulfate, maleate, tartrate, or a succinate ion and the like. Other anionic residues such as citrate and the like can also be used by varying the cation-anion ratio to satisfy the valence requirements.

The new compounds of my invention also include symmetrical N,N'N,N' - diethylene - dipolymethylenimine quaternary hydroxides and their salts. The cations of these symmetrical compounds can be represented by the formula:

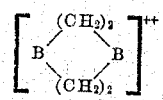

in which the significance of B is the same as above. It is to be noted that Z has a value of 2 in the symmetrical compounds. The valence requirements of the symmetrical cations are satisfied as above with the compounds in which A and B are different.

The salts of the present invention are prepared by reacting ethylene - N,N' - dipolymethylenimines and tri-methylene-N,N'-dipolymethylenimines which are disclosed in my copending application Serial No. 432,582 filed May 26, 1954 with ethylene or trimethylene dihalides. The reaction can be illustrated by the following equation:

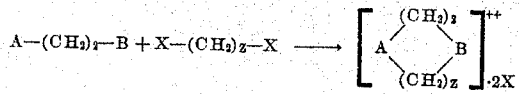

in which A, B and Z have the same significance as in the generic formulae given above and X represents a halide ion such as chloride or bromide. The parent compounds of my invention, i. e., the quaternary hydroxides, can be prepared from the above salts by conventional methods, e. g., treatment of the salt in aqueous solution with silver oxide. The complete structural formulae of typical reactants and products are illustrated by the equations below.

The following examples will serve to illustrate the invention.

1.

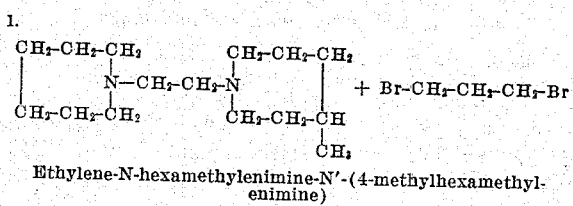

Ethylene-N-hexamethylenimine-N'-(4-methylhexamethyl-enimine)

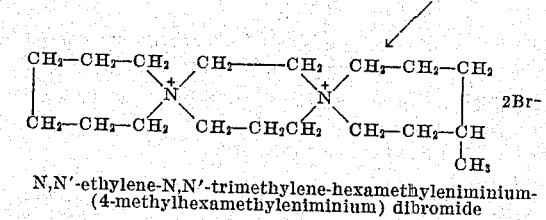

N,N'-ethylene-N,N'-trimethylene-hexamethyleniminium-(4-methylhexamethyleniminium) dibromide

2.

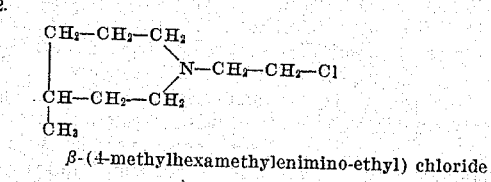

β-(4-methylhexamethylenimino-ethyl) chloride

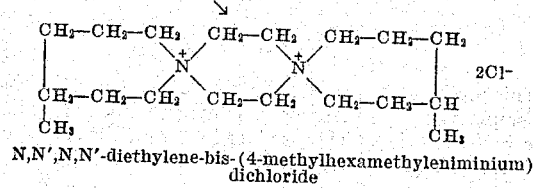

N,N',N,N'-diethylene-bis-(4-methylhexamethyleniminium) dichloride

Example I

*N,N',N,N' - diethylene - hexamethyleniminium - (4 methylhexamethyleneiminium) dibromide*

A mixture of ethylene-N-hexamethylenimine-N'-(4-methylhexamethylenimine) (0.02 mole) and 1,2-dibromoethane (0.025 mole) and 50 ml. of isopropyl alcohol was refluxed for twenty-four hours, then cooled and filtered. The precipitate recovered was dissolved in a few ml. of water, decolorized with activated charcoal and reprecipitated with isopropyl alcohol. The desired product, after drying at 110° C. had a melting point of 320–321° C. (decomposition).

The dipicrate was obtained by adding aqueous picric acid to a concentrated aqueous solution of the quaternary dibromide until precipitation ceased. The dipicrate was purified by recrystallization from aqueous acetone and had a melting point of 288° C. (explosion).

Example II

*N,N',N,N', - diethylene - octamethyleniminium - (4 methylhexamethyl-eneiminium) dibromide*

This product was prepared in accordance with Example I by reacting 1,2-dibromoethane with ethylene-N-octamethylenimine - N' - (4 - methylhexamethylenimine). The product had a melting point of 289–296° C. (decomposition). The dipicrate, obtained as above, had a melting point of 275° C. (explosion).

Example III

N,N' - ethylene - N,N' - trimethylene - hexamethyleniminium-(4-methyl-hexamethyleniminium) dibromide

This product was prepared in accordance with Example I by reacting 1,3-dibromopropane with ethylene-N-hexamethylenimine - N' - (4 - methylhexamethylenimine). The product had a melting point of 300°–301° C. (decomposition.). The dipicrate had a melting point of 256–258° C. (decomposition).

Example IV

N,N', - ethylene - N,N' - trimethylene - octamethyleniminium-(4-methyl-hexamethyleniminium) dibromide

This product was prepared in accordance with Example I by reacting 1,3-dibromo propane with ethylene-N-octamethylenimine - N' - (4-methylhexamethylenimine). The product had a melting point of 268–269° C. (decomposition). The dipicrate had a melting point of 214–217° C. (decomposition).

Example V

N,N',N,N' - diethylene - bis - (4 - methylhexamethyleniminium) dichloride

A chilled aqueous solution of 10.6 grams (0.05 mole) of β-(4-methylhexamethyleniminoethyl) chloride hydrochloride was mixed with a cooled solution of 6 grams (0.15 mole) sodium hydroxide in 20 ml. of water. The mixture was extracted with three 30 ml. portions of ether and the extract dried over potassium carbonate, then added to 50 ml. of isopropyl alcohol. The ether was distilled off and the residual solution was refluxed for about 20–24 hours. The reaction mixture was then cooled and filtered. The precipitated product weighed 8.5 grams, indicating a yield of 97%. The salt was recrystallized from 90 per cent ethyl alcohol to give a purer product which had a melting point of 330–332° C. (decomposition).

Example VI

N,N',N,N', - diethylene - bis - (2 - methylhexamethyleniminium) dichloride

This product was prepared in accordance with Example V, employing β-(2-methylhexamethyleniminoethyl) chloride hydrochloride. The product had a melting point of 276–277° C. (decomposition).

Example VII

N,N',N,N' - diethylene - bis - (heptamethyleniminium) dichloride

This product was prepared in accordance with Example V, employing β-(heptamethyleniminoethyl) chloride hydrochloride. The product had a melting point of 285–286° C. (decomposition).

Example VIII

N,N',N,N' - diethylene - bis - (octamethyleniminium) dichloride

This product was prepared in accordance with Example V, employing β-(octamethyleniminoethyl) chloride hydrochloride. The product had a melting point of 275–276° C. (decomposition).

The various other salts of my new compounds can be prepared by substitution of the anion in accordance with standard procedures. For instance, the dibromides described above can be converted to the corresponding dichlorides or sulfates by treating an aqueous solution of the dibromide with silver oxide, filtering to remove the halide precipitate, and neutralizing the filtrate, which comprises an aqueous solution of the corresponding quaternary hydroxide with hydrochloric or sulfuric acid respectively. The organic acid salts can be prepared in a like manner. The iodides can be obtained by mixing warm methanolic solutions of the chloride or bromide with a stoichiometric quantity of potassium iodide in methanol, filtering the precipitated potassium halide, and evaporating the filtrate to obtain the crude salt which may be purified by dissolution in water and precipitation with isopropyl alcohol. In a similar way reaction of a quaternary sulfate dissolved in water with a soluble barium salt such as a nitrate can be used to convert the sulfate to another desired salt.

The β-(polymethyleniminoethyl) chloride hydrochlorides used in the preparation of my novel compounds by the procedure of Example V, are readily prepared by those skilled in the art. The following example illustrates a preferred method for the preparation of these compounds:

Example IX

β-(Hexamethyleniminoethyl) alcohol and chloride

A mixture of 119 grams (1.2 moles) of hexamethylenimine in 100 ml. of dry benzene was heated and stirred under reflux while adding 40.3 gr. (0.5 mole) of ethylene chlorohydrin. After refluxing for sixteen hours, 25 gr. of sodium hydroxide in 75 ml. of water was added. The organic layer of the reaction mixture was separated and washed with 75 ml. of water. The combined aqueous layers were extracted with two 75 ml. portions of ether. The ether extracts and the organic layer from the reaction mixture were combined, dried over magnesium sulfate and distilled. The product alcohol had a boiling point of 111° C. at 23 mm. and was obtained in the yield of 68.5 grams or 91.5%.

This alcohol, 65.7 grams (0.46 mole), was added slowly to a solution of 66.6 grams (0.56 mole) thionyl chloride in 150 ml. of dry benzene. The mixture was diluted to a volume of 450 ml. with dry benzene, refluxed for 12 hours, and then cooled and filtered. The precipitate was washed with benzene followed by ether and dried to give a light tan product consisting of the β-(hexamethyleniminoethyl) chloride hydrochloride. The product was recrystallized from isopropyl alcohol in yield of 80% and had a melting point of 208–209° C.

The bases and salts of the present invention are physiologically active and are characterized, among other things, by their blood pressure lowering properties. My novel compounds are water soluble and may be administered parenterally or orally.

It is to be understood that the foregoing examples are for illustrative purposes only and are not to be construed as limiting the scope of the invention.

I claim:

The compounds of the formula

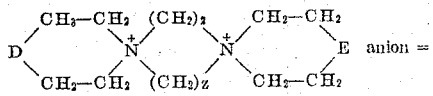

in which D and E are radicals selected from the group consisting of methylene, ethylene, propylene and butylene with the proviso that when D and E are different, Z is an integer from 2 to 3 and the compounds contain at least 17 carbon atoms, with the proviso that when D and E are the same, Z is 2 and D and E are selected from the group consisting of ethylene and propylene, and with the further proviso that when a ring of the formula contains 6 carbon atoms it can be substitued with a methyl group.

References Cited in the file of this patent

Fulton et al.: Proc. Roy. Soc. (London), vol. 137B, pp. 339–66 (1950).

Libman et al.: J. Chem. Soc., vol. 1952, pp. 2305–7.